July 27, 1965

T. H. EYLES 3,196,483

MOLDING DEVICE

Filed March 5, 1962

INVENTOR.
THOMAS H. EYLES
BY *Leon R. Horne*
ATTORNEY.

July 27, 1965  T. H. EYLES  3,196,483
MOLDING DEVICE
Filed March 5, 1962  5 Sheets-Sheet 3

INVENTOR.
THOMAS H. EYLES.
BY Leon R. Horne
ATTORNEY.

July 27, 1965  T. H. EYLES  3,196,483
MOLDING DEVICE

Filed March 5, 1962  5 Sheets-Sheet 4

INVENTOR.
THOMAS H. EYLES
BY Leon R. Horne
ATTORNEY

July 27, 1965 T. H. EYLES 3,196,483
MOLDING DEVICE

Filed March 5, 1962 5 Sheets-Sheet 5

INVENTOR.
THOMAS H. EYLES
BY Leon R. Horne

ATTORNEY.

United States Patent Office 3,196,483
Patented July 27, 1965

3,196,483
MOLDING DEVICE
Thomas H. Eyles, Leominster, Mass., assignor to Foster Grant Co., Inc., Leominster, Mass., a corporation of Delaware
Filed Mar. 5, 1962, Ser. No. 177,524
12 Claims. (Cl. 18—2)

This invention relates generally to the art of degating plastic molded articles. More specifically, this invention relates to a novel apparatus and method advantageously employed in degating a molded article while the article is firmly held within a mold in which it is formed.

It is well known in the art that molded articles are conventionally formed in molds wherein a runner and gate are formed integrally with the molded article. Many methods have been employed for removing the runner and gate from the molded article. Frequently, the article is removed from the mold cavity with a gate and runner firmly attached thereto. A separate operation is then employed to cut the gates from the article. Commonly, the molded article is placed in a frame and a cutter, similar to a paper cutter, is used to cut the article from the gate and thus separate the molded article and the runner. Other known methods include various vibratory devices which tend to break the gates, the use of pinpoint or extremely small gates which are broken when the molded article drops from the mold cavity, submarine gating, etc.

Two main disadvantages are common when employing conventional degating techniques. One disadvantage is that the cut or break produced in the separating step usually leaves a mark or flaw on the molded article itself. This degate mark is undesirable appearance wise and in some cases a thin "string" of material remains at the gate point. In many methods of degating a second procedure is required, i.e., the actual degating is accomplished after the article is removed from the mold cavity or partially removed therefrom. Obviously, the second procedure is not only time-consuming but also increases the cost of molded articles.

I have now discovered an novel and advantageous apparatus for degating molded articles in an efficient, time-saving manner. Briefly, my apparatus employs a cutting device within the mold proper. Since the cutting device is actuated during the molding cycle, there is minimum of lost time. In addition, the molded articles produced by the device of my invention, have superior surface appearances in that the degate portion is barely, if at all recognizable.

Basically, the invention may be described as employing a mold which has two mating die cavity blocks of the conventional type positioned in their closed position. A thermoplastic material is injected through a runner and gate forming a passageway into the mold cavity. At the end of the molding cycle, a cutter or ejector pin is caused to move past the gate during the opening of the mold, thus cutting or breaking the gate cleanly from the molded article within the mold cavity. The die cavity blocks are then parted and the degated molded article ejected from by mold. By accomplishing this cutting action while the mold is opening, no unnecessary time is employed in the degating process.

The advantageous apparatus of this invention can be employed in molding articles of various types, e.g., sunglasses, combs, dishes, boxes, containers, etc. Any of the conventional thermoplastic materials may be employed in the apparatus and method of this invention, e.g., nylon, polystyrene, impact polystyrene, cellulose acetate, cellulose butyrates, lead, etc.

The advantages and features of my invention will become readily apparent from the following detailed description and illustrations which are not limiting but only illustrative of a preferred embodiment of my invention. In the attached drawing like numerals represent like parts.

Figure 1:
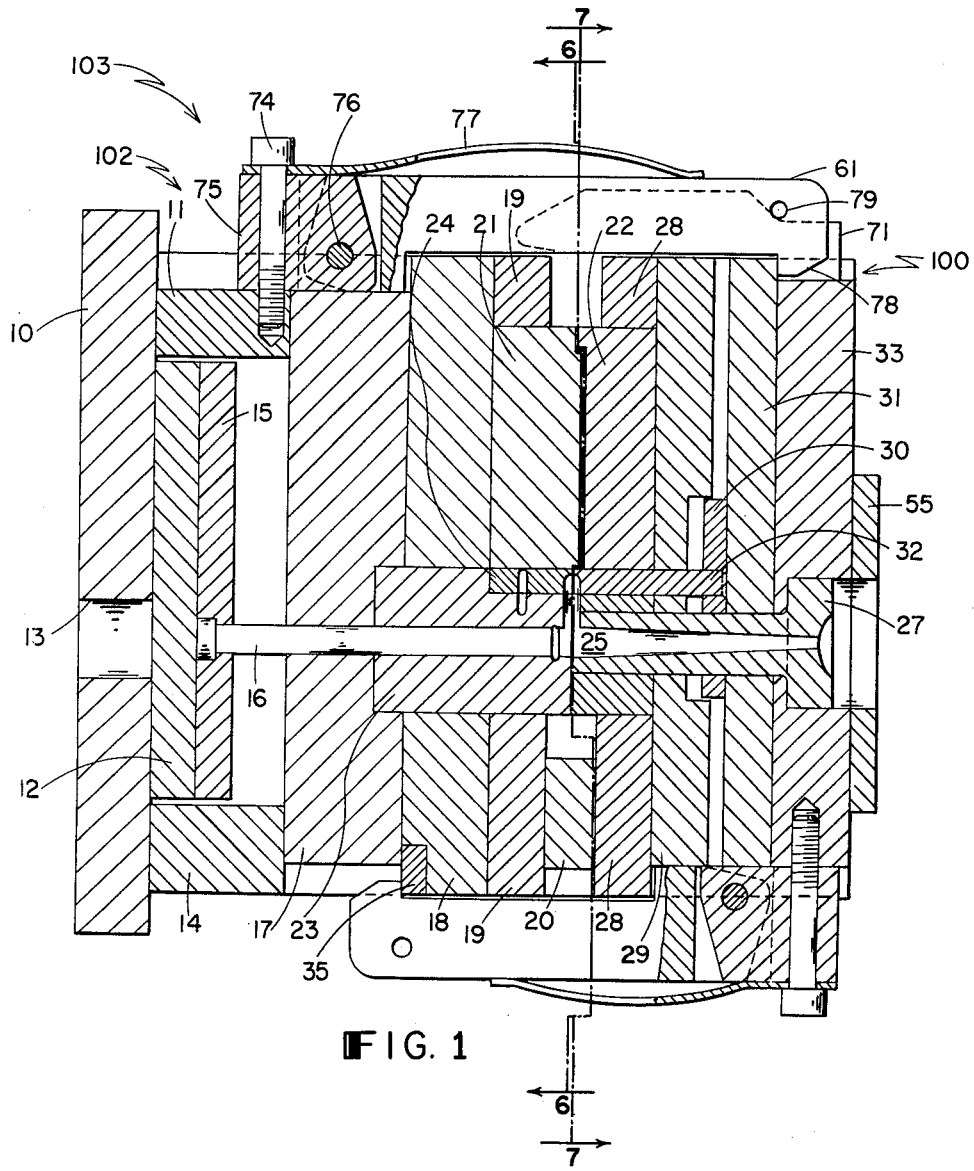
FIGURE 1 is a side sectional view taken through the center of a mold embodying the advantages of this invention.

In the preferred embodiment of this invention illustrated in FIGURES 1-7, a mold 103 is shown. The mold comprises an ejection half 102, an injection half 100 and a set of 4 cooperating latches. The mold is basically of a conventional nature and is designed to be used with conventional injection molding machines.

As best seen in FIGURES 1-3 and 6, the ejection half of the mold comprises a first portion comprising a conventional ejection back-up plate 10 having a bumper pin receiving bore 13 located substantially centrally within said plate. Conventional ejector nest risers 11 and 14 are provided on the upper and lower portions of the back-up plate 10, thus forming a nest for a conventional ejector plate binder 12 and integrally attached pin plate 15. Conventional sprue ejector 16 and ejection pins 56 are firmly affixed to pin plate 15. Ejection pins 56 and sprue ejector 16 may be actuated by movement of binder plate 12 and pin plate 15 which horizontally reciprocate within the nest formed by ejector nest risers 11 and 14 as will be more fully described hereinafter. A conventional subshoe plate 17 is mounted on ejector nest risers 11 and 14 and immovably affixed thereto. Subshoe plate 17 provides a mounting for guide or locating pins 34 and a central bar 23. The locating pins 34 and central bar 23 are immovably affixed to the subshoe plate 17. With the exception of the binder plate 12 pin plate 15 and attachments thereto, the foregoing elements, i.e., 10, 11, 14, 17 and 23 are integrally joined and are immovable with respect to each other.

The second portion of the ejection half of the mold is formed by a series of elements which are immovable with respect to each other but moveable with respect to the first group of elements recited. Conventional cavity support plate 18 is slidably mounted on central bar 23 and locating pins 34. Firmly affixed to the cavity support plate 18 is conventional ejection cavity plate 19 which supports an ejection die cavity block 21 and a spacer plate 20. It should be understood that in the particular preferred embodiment shown, only one cavity is employed. However, the principles of this invention can be employed in multicavity molds, as well as single cavity molds. As clearly seen in FIGURES 2 and 3, the second portion of the ejection half of the mold is movable along an axis drawn through the sprue ejector 16 and slides on locating pins 34 and central bar 23, during various operations of the mold. Conventional stops may be provided on locating pins 34 or central bar 23 to prevent the second portion of the ejection half of the mold from sliding off 34 and 23 during operation of the mold.

Although all of the elements of the mold are preferably composed of conventional hardened steel material, it is advantageous to employ specially reinforced steel elements at points of greatest stress. Thus, a rectangular hardened steel insert 24 is employed in the central bar 23 and hardened steel latch pads 35 may be inserted in the cavity support plate 18 at the outer edge thereof as clearly shown in FIGURE 1. Die cavity blocks employed may be composed of any desired material such as brass, steel, etc.

The injection half of the mold is composed of a first portion comprising a set of elements which are immobile with respect to each other and a second portion comprising a set of elements which are immobile with respect to each other and movable with respect to said first portion.

The first portion of the injection half of the mold comprises a conventional injection back-up plate 33 carrying on an outer side a centrally located molding machine nozzle locating ring 55 and a firmly affixed sprue bushing 27 rising perpendicular thereto. Sprue bushing 27 leads into sprueway 25 which directs the thermoplastic material into the mold. Injection cavity support plate 29 is firmly attached to the shaft of fill bushing 27 and to back-up plate 33 by means of conventional riser blocks not shown in the drawings. Firmly attached to the cavity support plate 29 is a conventional cavity plate 28 carrying injection die cavity block 22 thereon.

The second portion of the injection half of the mold comprises a cutter ejector plate 31 and integrally attached pin plate 30 mounted in slidable relationship on a shaft of fill bushing 27 between the cavity support plate 29 and the injection back-up plate 33. A rectangular cutter pin 32 is anchored on plate 31 by means of a substantially disc shaped pin plate 30. Although a rectangular cross-section cutter pin is employed in the preferred embodiment described, it will be readily apparent to one skilled in the art that other configurations may be employed if desired. Plates 31, 30 and firmly affixed cutter pin 32 are slidable in an axial direction along the shaft of fill bushing 27. The rectangular cross section cutter pin 32 comprises an end 90 which is provided with a recess 90a which forms a portion of sprueway 25. The end 90 of cutting pin 32 additionally acts as a cutting blade for cutting the gate during opening of the mold. When the mold is closed as shown in FIGURE 1, cutter ejector plate 31 is located adjacent back-up plate 33. When the mold is open as shown in FIGURE 3, cutter ejector plate 31 is adjacent cavity plate 29 with pin plate 30 filling a corresponding preferably circular recess in cavity support plate 29.

Figure 2:
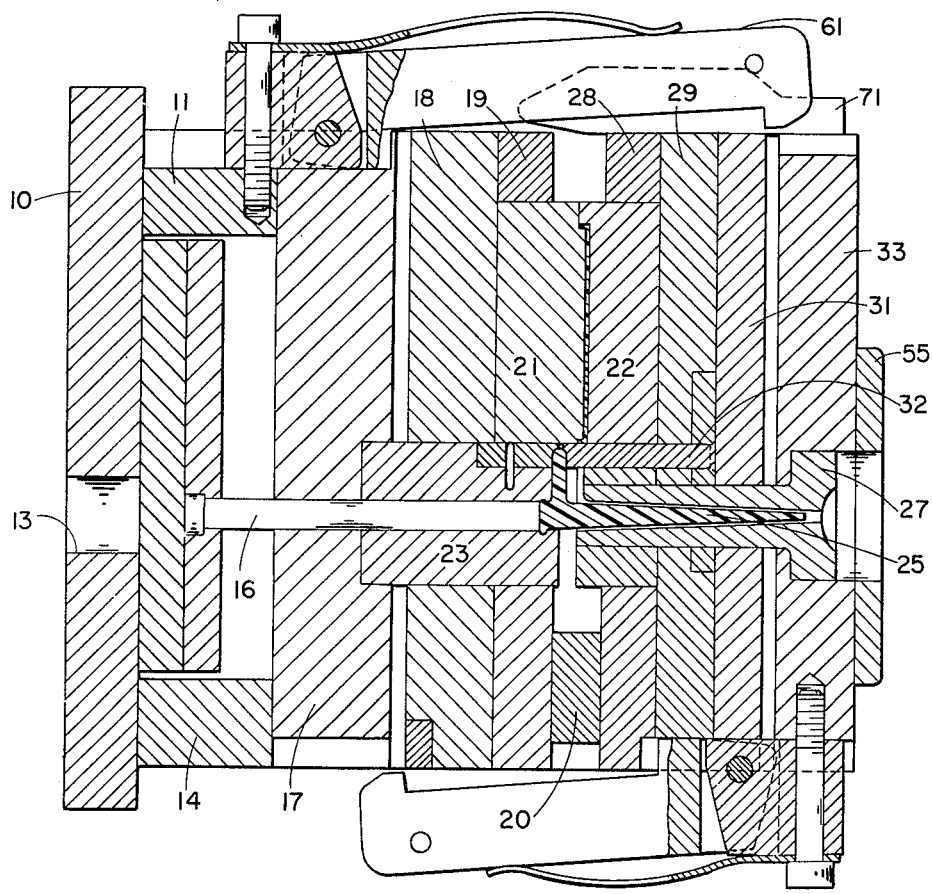
FIGURE 2 is a side sectional view taken through the center of the mold of this invention with the mold in a partially open position.

The actuating means for causing movement of the movable portions of the injection and ejection halves of the mold may comprise latch means as shown in the preferred embodiment of the invention. Alternatively, hydraulic or other conventional means may be employed to cause a sliding action of the mold of this invention. The latch means shown in the present embodiment comprises four latches 60, 61, 62 and 63, each having corresponding cam slide blocks 70, 71, 72 and 73. In order to simplify the drawings, only cam slide block 71 is illustrated in FIGURES 1–3. Each latch comprises a bolt such as shown at 74 for retaining a part of the latch firmly on a first portion of the mold, a T-shaped block 75 for providing a mounting block for the latch means, a pin 76 which passes through a fork shaped portion of the latch and the mounting block 75, a spring 77, a hooked end portion 78 and a cam follower pin 79. The fork shaped portion of the latch is mounted on the mounting block 75 and is pivotable with respect to said block with the outer end of the latch forming a hook 78 for engaging second slidable portion of the mold. A flat spring member 77 is shown clearly in FIGURES 1–5 for resiliently urging the latch against the mold at all times. It is clear that various biasing means may be employed in place of the spring member 77 if desired. Latches 61 and 63 are mounted on opposite sides of the mold with 61 being mounted on ejection nest riser 11, and 63 being directly mounted on ejection nest riser 14. Corresponding cam slide blocks 71 and 73 are mounted on the back-up plate member 33 of the injection half of the mold. These latches operatively engage the cutter or ejector plate 31 when the mold is completely closed. Latches 60 and 62 are mounted on opposite sides of the mold and directly affixed to the back-up plate 33 with corresponding cam slide blocks 70 and 72 being mounted on the ejection nest risers on the ejection half of the mold. As clearly seen in FIGURES 1 and 2 when the mold is in its closed position, latches 61 and 63 are in the position shown in FIGURES 1 and 2 with the pins 79 resting on the cam slide blocks provided. Latches 60 and 62 at this point are engaged with hardened latch pads 35 on cavity support plate 18.

Figure 3:
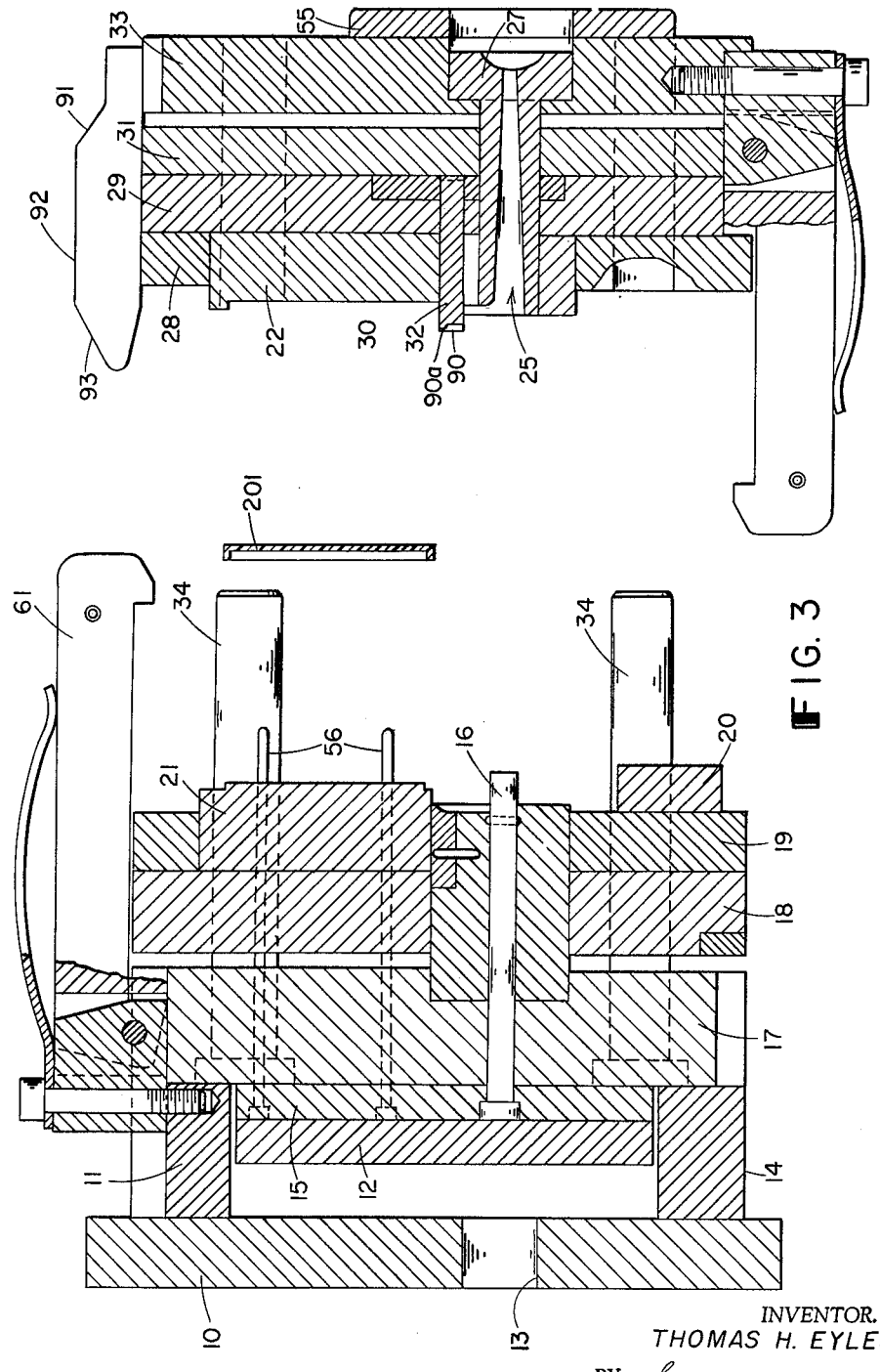
FIGURE 3 is a side sectional view of the mold of FIGURE 1 in the open position.
Figures 4, 5, 6:
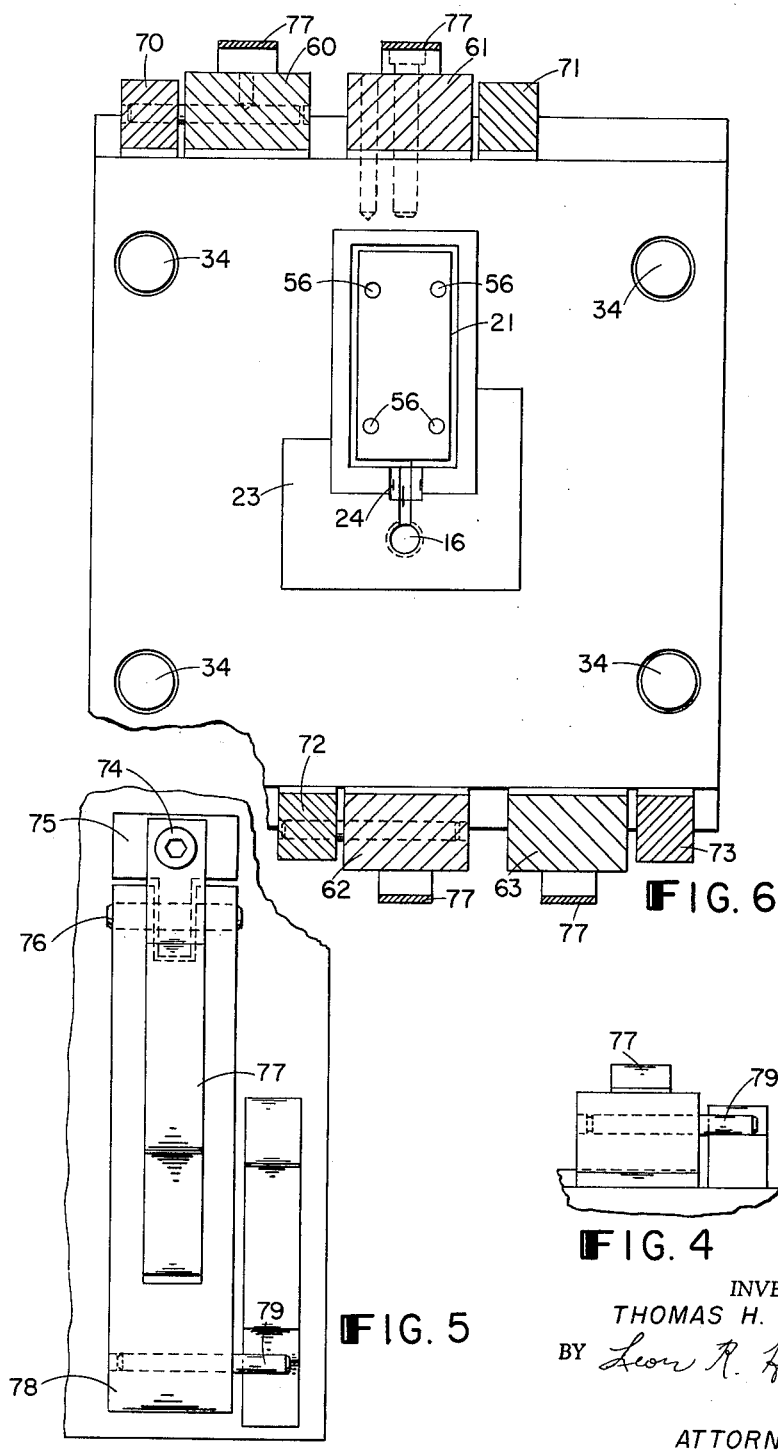
FIGURE 4 is a plan view along a front axis of the mold of FIGURE 1 showing a latch and cam of this invention.
FIGURE 5 is a top plan view of a latch and cam embodying the invention.
FIGURE 6 is a face view of the ejection half of the mold taken along line 6—6 of FIGURE 1.
Figure 7:
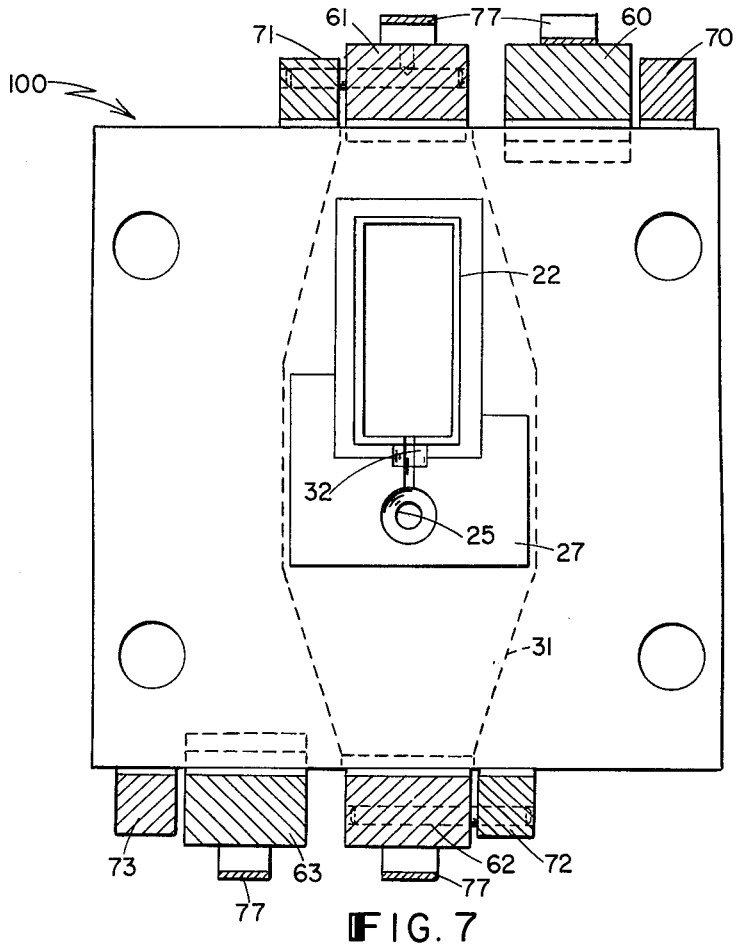
FIGURE 7 is a face view of the injection half of the mold taken along line 7—7 of FIGURE 1.

While the novel mold of this invention is preferably employed as a vertically opening mold, as shown in FIGURES 1–3; it is obvious that it may also be employed as a horizontally opening mold if desired.

In use, the mold is attached to a conventional injection molding machine by firmly attaching back-up plates 33 and 10 to conventional platens on such a machine. The injection nozzle of the molding machine is fitted into engagement with sprue bushing 27 and bumper pin of the molding machine is aligned with opening 13 in back-up plate 10. It is obvious that the particular shape of sprue bushing 27 and nozzle locating ring 55 may vary depending on the particular molding machine employed.

The operation of the advantageous mold of this invention is simple, efficient, and economical. In the completely closed position, the mold elements are arranged as shown in FIGURE 1. Ejector or cutter plate 31 is closely adjacent back-up plate 33 of the injection cavity half, ejector plate 12 is closely adjacent back-up plate 10 and cavity plate 18 is closely adjacent subshoe plate 17 of the ejection half of the mold. The die cavity blocks 21 and 22 are aligned to form a mold cavity. Latches 61 and 63 engage the opposite edges of cutter or ejector plate 31 and latches 60 and 62 engage opposite edges of cavity support plate 18 at the latch pad elements 35 thereof. Thermoplastic material is injected through the sprue bushing 27 along the sprueway 25 into the molding cavity formed by die cavity blocks 21 and 22. A molded article such as the rectangular plastic cover 201 is formed within the molding cavity. Sufficient time is allowed for the molded articles to solidify within the molding cavity and then the opening action of the mold is commenced.

Back-up plates 33 and 10 are moved apart in relation to each other in an axial direction continuously. The parting is accomplished by moving back up plate 10 to the left as shown in FIGURE 2 while maintaining back-up plate 33 stationary. FIGURE 2 shows the position of the mold elements after the first portion of the travel thereof which may comprise approximately one-half inch. The particular distance of travel required for operation of the various elements of the mold may be varied depending upon the size of the mold, the specific molded articles being formed, and other variables within the mold. As clearly shown in FIGURE 2 at the end of the first portion of the opening of the mold, the mold elements assume the positions shown with the die cavity blocks 21 and 22 remaining completely closed and the gate being completely severed from the molded article formed in the molding cavity. During the first portion of the opening of the mold, latches 60 and 62 retain the second portion of the ejection half of the mold in its original portion thus creating a space between cavity support plate 18 and subshoe plate 17. During this period, the first portion of the injection half of the mold remains in its fixed position while cutter or ejector plate 31 and attached pin plate 30 and cutter pin 32 are moved simultaneously in the same direction of travel as back-up plate 10 and for the same distance as back-up plate 10 by the action of latches 61 and 63 which being firmly attached to ejection nest riser blocks 11 and 14 move axially of the mold along with back-up plate 10. Thus, it will be seen that a portion of the sprueway 25, i.e. the portion 90a is shifted during initial opening cycle of the mold prior to the opening of the mold cavity. By this action the sprue is removed during the mold opening cycle but before the mold cavity opens; and no unnecessary time is employed in the degating process. Furthermore, the molded article has a superior surface appearance in that the degated portion is barely, if at all recognizable.

During the first portion of travel of back-up plate 10, latches 61 and 63 move in the same direction of travel as the back-up plate while slide cam blocks 71 and 73 remain stationary. In addition, cam slide blocks 70 and 72 move in the same direction of travel as back-up plate 10 while latches 60 and 62 do not move in an axial direction. Therefore, due to the cam action of surfaces 91 of the cam slide blocks the latches are continuously pivoted away from the mold and upon reaching the position shown in FIGURE 2, the latches are pivoted outwardly from the mold and the pins 79 reach the top flat surfaces 92 of the cam slide blocks and the hook portions thereof are disengaged from the mold members. At all points during movement of the mold halves with respect to each other, spring members 77 tend to exert a resilient pressure on the latches tending to push the latches toward the mold the spring pressure is overcome as the latches pivot on pins 76 and are forced outwardly from the mold by the cam action of the cam slide blocks.

Upon further movement of the back-up plate 10 the latches slide along the top surface 92 of the cam slide blocks and finally down the cam surfaces 93 thereof and assume the position shown in FIGURE 3 wherein the mold is fully opened. Upon further opening of the mold from the position shown in FIGURE 2, the second portion of the ejection mold half and the second portion of the injection mold half are not operatively engaged with the latch members. The mold is then free to part thus opening the molding cavity formed by die cavity blocks 21 and 22. At this point, a conventional bumper pin is actuated through bore 13 and causes the ejector plate 12 to move towards the injection half of the mold which forces ejection pins 56 and sprue knockout pin 16 to eject the plastic material which may remain in the mold.

When the plastic material is removed from the mold, the mold may then be clamped or closed again by moving back-up plate 10 towards the injection cavity half. Upon closing the mold, the cam follower pins 79 of the latches move along cam slide block surfaces 93, 92 and 91 into their original closed position as shown in FIGURE 1. The second portion of the ejection half of the mold is forced into its original position shown in FIGURE 1 when it meets the first portion of the injection half of the mold and similarly the second portion of the injection half of the mold is forced into its original position shown in FIGURE 1 when it meets the first portion of the ejection half of the mold. The ejection plate 15 and attached pins 56 are returned to their original position by conventional return pins (not shown). Alternatively, hydraulic or other return means may be employed. At this point the mold is again closed and ready for injection of plastic material.

From the above description of the molding cycle, it is readily apparent that the device of this invention provides a method of degating plastic molded articles formed during an injection molding procedure wherein the degating is accomplished during the normal molding cycle. Thus, no time is lost in the molding cycle and a completely finished molded article may be removed from the molding cavity. Apparently, as a result of the fact that the molded article is firmly held within its original mold cavity and the gate is firmly held in its original forming passageway during the degating procedure, degating is accomplished without normally occurring marring or noticeable formation of a degate mark on the molded plastic item.

In the specific embodiment of the invention I employ a molding cavity for molding a polystyrene box lid having a length of 2½″ and a width of 1½″. A rim of approximately 3/16″ is provided around the lid and the thickness of the lid is approximately 0.060 inch. I employ a molding temperature of 380° F. and a molding cycle of 10 seconds. The degating action is accomplished during the first portion opening of the mold and the latch is released when the mold has opened approximately ¾ inch. Advantageous box lids having no noticeable degate marks are formed using these conditions.

Numerous modifications and variations of the present invention will occur to those skilled in the art. All such, properly within the basic spirit and inventive concept of the present invention, are intended to be included and comprehended herein as fully as if specifically described, illustrated and claimed herein.

For example, although I have shown specific structures, configurations and relative positionings of various conventional elements of the mold they can be modified substantially within the spirit of the present invention. It is possible in some instances to eliminate elements such as ejector pins 56 or to combine and make integral elements such as back-up plate 10, ejection nest risers 11, 14 and subshoe plate 17. Obviously, the use of spacer blocks such as 20 may be unnecessary or the use of plural blocks may be desired depending upon mold size and mold pressure employed.

The embodiments of the present invention specifically described and illustrated herein are exemplary only, and are not intended to limit the scope of the present invention, which is to be interpreted in the light of the prior art and the appended claims only with due consideration for the doctrine of equivalents.

I claim:

1. A mold for molding thermoplastic articles comprising a pair of cooperating die cavity blocks, a movable ejector degating cutter pin mounted on a movable ejector degating pin plate, means for retaining said die cavity blocks in a closed position and means for moving said ejector degating pin plate and said ejector degating cutter pin whereby a plastic gate formed in molding a thermoplastic article in said die cavity blocks is cut and removed from said article while said article is retained in said mold cavity.

2. An injection mold for forming thermoplastic articles comprising an ejection half and a cooperating injection half, said ejection half comprising a first portion and a second portion slidably mounted on said first portion and carrying a first die cavity block, said injection half comprising a first portion having a second die cavity block thereon adapted to register with said first die cavity block to form a molding cavity and a gate passageway, and a second portion slidably mounted on said first portion of said injection half and comprising an ejector cutter degating pin mounted on an ejector degate plate.

3. An injection mold for forming thermoplastic articles comprising an ejection half, a cooperating injection half and means for causing movement of said injection half and said ejection half, said ejection half comprising a first portion and a second portion slidably mounted on said first portion and carrying a first die cavity block, said injection half comprising a first portion having a second die cavity block thereon adapted to register with said first die cavity block to form a molding cavity and a gate passageway, and a second portion slidably mounted on said first portion of said injection half and comprising an ejector cutter degating pin mounted on an ejector degate plate.

4. The injection mold of claim 3 wherein said means comprises means for locking said die cavity blocks together in a closed position to form a mold cavity when the mold in closed and retaining said mold cavity blocks closed while actuating said ejector degate plate and said ejector cutter degating pin during a first portion of opening of the mold and releasing said die cavity blocks allowing them to open during a second portion of opening of the mold.

5. The injection mold of claim 3 wherein said means comprises a plurality of hook shaped latches and a plurality of operatively engaged cam slide blocks.

6. An injection mold for forming thermoplastic articles comprising an ejection half, a cooperating axially aligned injection half and means for causing movement of said injection and ejection half operatively engaged with said injection half and said ejection half, said ejection half comprising a first portion and a second portion slidably mounted on said first portion and carrying a first die cavity block, said injection half comprising a first portion having a second die cavity block thereon adapted to register with said first die cavity block to form a molding cavity and a gate passageway, and a second portion slidably mounted on said first portion of said injection half and comprising an ejector cutter degating pin having a first cutting end which forms a portion of a gate passageway and a second end firmly affixed to an ejector degate plate.

7. The injection mold of claim 6 wherein said means comprises means for locking said die cavity blocks together in a closed position to form a mold cavity when the mold is closed and retaining said mold cavity blocks closed while actuating said ejector degate plate and said ejector cutter degating pin during a first portion of opening of the mold and releasing said die cavity blocks allowing them to open during a second portion of the opening of the mold whereby a gate originally formed integral with a molded article in the mold may be cut from the article during a normal molding cycle while the article is firmly positioned in the die cavity blocks.

8. The injection mold of claim 7 wherein said injection half comprises an axially aligned sprue bushing passing through said ejector degate plate.

9. The injection mold of claim 7 wherein said first portion of said injection half is immovably mounted and said first portion of said ejection half is mounted so as to be movable in a direction axial to said mold.

10. The injection mold of claim 6 wherein said means comprises a plurality of hook shaped latches and a plurality of operatively engaged cam slide blocks, at least one of said hooks, being mounted on said injection half and at least one of said hooks being mounted on said ejection half.

11. The injection mold of claim 6 wherein said ejection half comprises an axially movable ejector plate and firmly affixed ejector pins extending into said first die cavity block.

12. A mold for molding thermoplastic articles comprising a pair of molding sections, each of which includes a die block, a passageway leading into the molding cavity formed by the die blocks; and adapted to provide a conduit for the flow of molten plastic into said molding cavity; at least that portion of the passageway contiguous to the molding cavity being movable to degate the sprue formed in said molding sections while the die blocks are still closed; whereby the molded articles are degated while still being firmly held within the closed die blocks.

References Cited by the Examiner

UNITED STATES PATENTS

| 2,558,026 | 6/51 | Wilson | 18—55 |
| 2,976,568 | 3/61 | Foti | 18—30 |
| 2,992,455 | 7/61 | Slazman | 18—30 XR |
| 2,994,921 | 8/61 | Hultgren | 18—30 XR |
| 3,021,568 | 2/62 | Scott | 18—55 |

MICHAEL V. BRINDISI, *Primary Examiner.*

MORRIS LIEBMAN, *Examiner.*